United States Patent
Otomi et al.

(10) Patent No.: US 10,704,551 B2
(45) Date of Patent: Jul. 7, 2020

(54) ROTATION DEVICE AND EXTRANEOUS-MATTER REMOVING APPARATUS

(71) Applicant: FUJITSU TEN LIMITED, Kobe-shi, Hyogo (JP)

(72) Inventors: Masashi Otomi, Kobe (JP); Tomohisa Koseki, Kobe (JP)

(73) Assignee: FUJITSU TEN Limited, Kobe-shi (JP)

( * ) Notice: Subject to any disclaimer, the term of this patent is extended or adjusted under 35 U.S.C. 154(b) by 175 days.

(21) Appl. No.: 15/723,559

(22) Filed: Oct. 3, 2017

(65) Prior Publication Data
US 2018/0142688 A1    May 24, 2018

(30) Foreign Application Priority Data
Nov. 22, 2016    (JP) ................................ 2016-226955

(51) Int. Cl.
*F04C 29/00* (2006.01)
*B60S 1/56* (2006.01)
(Continued)

(52) U.S. Cl.
CPC .............. *F04C 29/005* (2013.01); *B08B 5/02* (2013.01); *B60S 1/56* (2013.01); *F04C 21/002* (2013.01); *F16H 19/001* (2013.01); *F16H 33/02* (2013.01); *B08B 3/02* (2013.01); *B60S 1/54* (2013.01); *F04C 2210/1005* (2013.01); *F04C 2220/28* (2013.01); *F04C 2240/10* (2013.01)

(58) Field of Classification Search
CPC ........ F04C 29/005; F04C 21/002; B08B 5/02; B08B 3/02; B60S 1/56; B60S 1/54; F16H 19/00; F16H 33/02
See application file for complete search history.

(56) References Cited

U.S. PATENT DOCUMENTS

| | | | |
|---|---|---|---|
| 7,658,671 B2 * | 2/2010 | Balzo ................. | B60H 1/00671 137/865 |
| 9,927,044 B2 * | 3/2018 | Kezar ................... | F16H 19/001 |

(Continued)

FOREIGN PATENT DOCUMENTS

| | | |
|---|---|---|
| JP | S58-174358 U | 11/1983 |
| JP | H04-028256 U | 3/1992 |

(Continued)

OTHER PUBLICATIONS

Sep. 10, 2019 Office Action Japanese Patent Application No. 2016-226955.

*Primary Examiner* — Dung Van Nguyen
(74) *Attorney, Agent, or Firm* — Oliff PLC (57) ABSTRACT

A rotation device according to an embodiment includes a first gear, a second gear, and an energizing part. The first gear includes a toothless part and is connected with a rotation driving source. The toothless part is obtained by cutting a part of continuous teeth of the first gear. The second gear is arranged to be able to be engaged with the first gear and is rotated, when engaged with the first gear, in a predetermined direction by a rotation of the rotation driving source in one direction. The energizing part energizes the second gear in a direction reverse to the predetermined direction when the second gear is in a free state in which an engagement of the second gear with the first gear is released by the toothless part.

14 Claims, 11 Drawing Sheets

(51) Int. Cl.
  *B60S 1/54* (2006.01)
  *B08B 5/02* (2006.01)
  *F04C 21/00* (2006.01)
  *F16H 19/00* (2006.01)
  *F16H 33/02* (2006.01)
  *B08B 3/02* (2006.01)

(56) References Cited

U.S. PATENT DOCUMENTS

2017/0355353 A1* 12/2017 Kato ................. B60S 1/481
2018/0246322 A1*  8/2018 Otomi ................ B60S 1/485
2019/0061385 A1*  2/2019 Valles Casanova .. B41F 13/016

FOREIGN PATENT DOCUMENTS

| JP | 2009-138482 A | 6/2009 |
| JP | 2014-037239 A | 2/2014 |
| JP | 2016-008005 A | 1/2016 |

* cited by examiner

INTAKE IS COMPLETED

ROTATION DEVICE AND EXTRANEOUS-MATTER REMOVING APPARATUS

CROSS-REFERENCE TO RELATED APPLICATION

This application is based upon and claims the benefit of priority of the prior Japanese Patent Application No. 2016-226955, filed on Nov. 22, 2016, the entire contents of which are incorporated herein by reference.

FIELD

The embodiment discussed herein is directed to a rotation device and an extraneous-matter removing apparatus.

BACKGROUND

Conventionally, there is known a camera that is provided in a vehicle so as to capture a vicinity of this vehicle. An image captured by this camera is, for example, displayed on a monitor for visibility auxiliary of a driver and used in sensing for detecting white lines on a road, an object approaching the vehicle, etc.

An extraneous matter such as a raindrop, a snowflake, dust, and mud is adhered to a lens of this camera to become an obstacle to the above visibility auxiliary and sensing, in some cases. Therefore, in recent years, there is proposed an extraneous-matter removing apparatus that ejects a compressed air toward the lens of the camera so as to remove the extraneous matter (see Japanese Laid-open Patent Publication No. 2014-037239, for example).

However, the aforementioned conventional technology has room for improvement in generating a compressed air with a simple and compact configuration.

Specifically, in generating a compressed air, there exists a case where a piston structure is employed for causing, for example, a piston to reciprocate in a cylinder so as to perform a series of cycles including intake and exhaustion. In this case, there exists a fear that the mechanism becomes complicated and the occupancy space becomes large. This problem is not limited to a case for generating a compressed air, and is common with a case for generating a compressed fluid obtained by compressing various gases and liquids, etc.

SUMMARY

According to an aspect of an embodiment, a rotation device includes a first gear, a second gear, and an energizing part. The first gear includes a toothless part and is connected with a rotation driving source. The toothless part is obtained by cutting a part of continuous teeth of the first gear. The second gear is arranged to be able to be engaged with the first gear and is rotated, when engaged with the first gear, in a predetermined direction by a rotation of the rotation driving source in one direction. The energizing part energizes the second gear in a direction reverse to the predetermined direction when the second gear is in a free state in which an engagement of the second gear with the first gear is released by the toothless part.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment of a rotation device and an extraneous-matter removing apparatus according to the present application will be described in detail with reference to the accompanying drawings. The present disclosure is not limited to the embodiment described in the following.

Hereinafter, an example will be explained, in which an extraneous-matter removing apparatus is an apparatus that is provided in a vehicle so as to remove an extraneous matter adhered to a camera for capturing the vicinity of the vehicle.

Hereinafter, outline of a configuration of an extraneous-matter removing apparatus 1 according to the present embodiment will be explained with reference to FIGS. 1A to 1C, and then a more specific configuration of the extraneous-matter removing apparatus 1 according to the present embodiment will be explained with reference to FIG. 2A and the following.

Figure 1A:
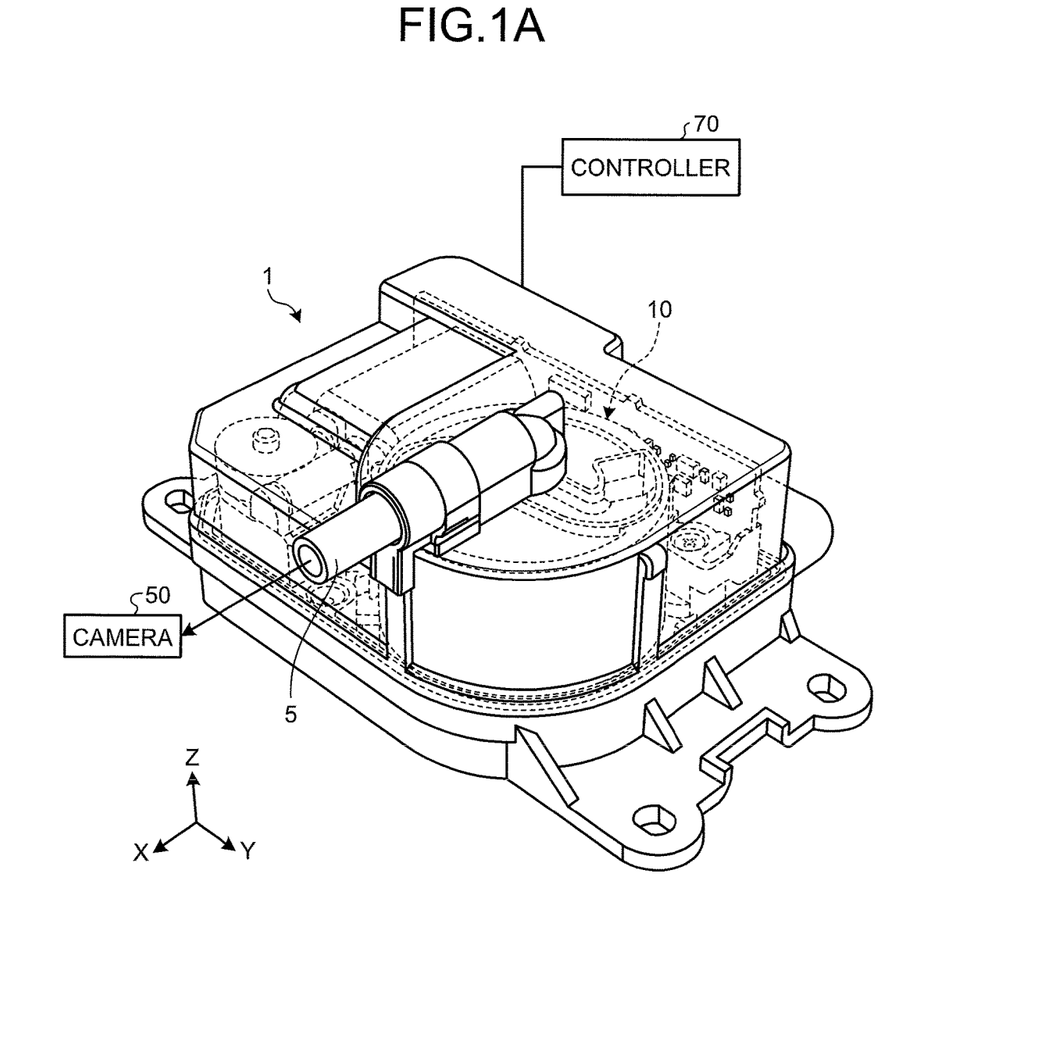
FIG. 1A is a see-through perspective view illustrating an extraneous-matter removing apparatus according to an embodiment.
Figure 1B:
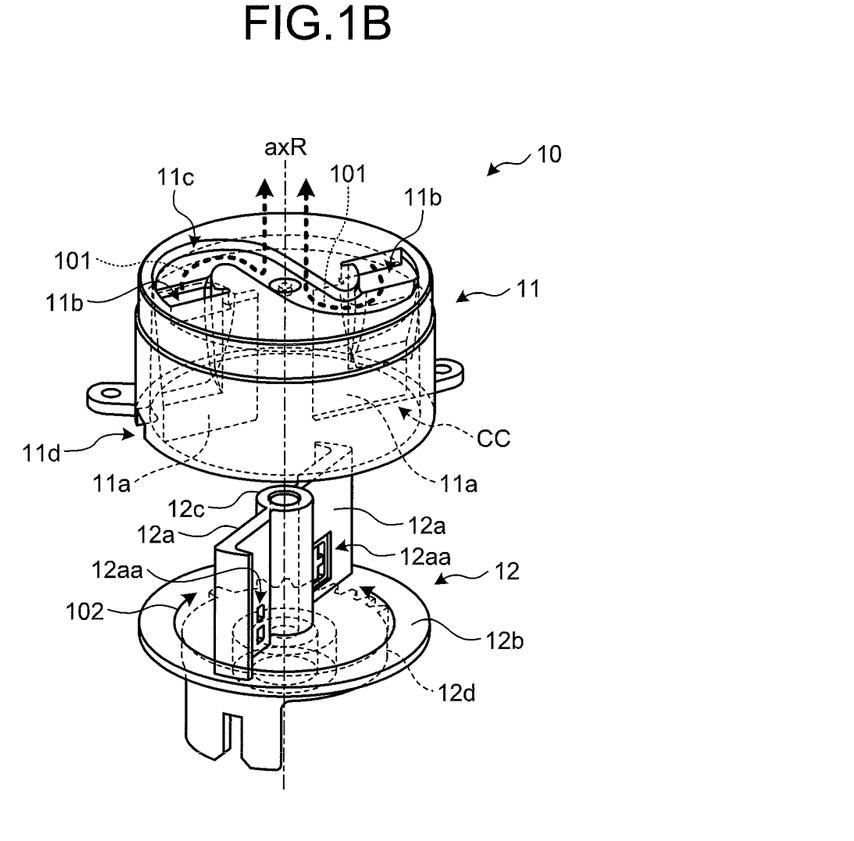
FIG. 1B is a see-through perspective view illustrating an air compressing part.

FIG. 1A is a see-through perspective view illustrating the extraneous-matter removing apparatus 1 according to the present embodiment. FIG. 1B is a see-through perspective view illustrating an air compressing part 10. FIG. 1C is a diagram explaining operations of the air compressing part 10.

As illustrated in FIG. 1A, the extraneous-matter removing apparatus 1 includes an output part 5 and the air compressing part 10. The air compressing part 10 compresses air so as to generate a compressed air, and ejects the generated compressed air to a camera 50 used for a vehicle through the output part 5 so as to remove an extraneous matter such as a raindrop adhered to a lens of the camera 50. Thus, it is possible to ensure accuracy in visibility auxiliary of a driver, sensing of an approaching object, etc.

A target whose extraneous matter is removed by the extraneous-matter removing apparatus 1 is here the camera 50, not limited thereto.

In other words, it is sufficient that the target is an optical sensor for acquiring, for example, an image through a lens, information of a target object existing in the vicinity of the vehicle, etc. Specifically, for example, the target may be various optical sensors such as a radar device for detecting a target object existing in the vicinity of the vehicle, and the detection accuracy of this optical sensor is able to be ensured.

The extraneous-matter removing apparatus 1 includes a controller 70. The controller 70 is a microcomputer including a central processing unit (CPU) and a storage (not illustrated) and controls a drive unit (to be mentioned later) so as to cause the air compressing part 10 to operate.

The air compressing part 10 includes a rotation-type air compressing mechanism. Specifically, as illustrated in FIG. 1B, the air compressing part 10 includes a cylinder 11 and a rotation part 12. The cylinder 11 includes cylinder walls 11a, communication openings 11b, a flow path 11c, and intake ports 11d. When provided in a vehicle, being small, light, and inexpensive is needed, and thus the cylinder 11 and the rotation part 12 are preferably formed of resin etc.

The cylinder 11 is cylindrically formed, for example, and a cylinder chamber CC is formed therein. The cylinder walls 11a are formed in a plate-like shape, for example, and are arranged so as to segment, along a substantially radial direction, the cylindrical cylinder chamber CC in positions to be point symmetry with the rotation axis axR as the center point. Therefore, cylinder chamber CC is partitioned into two parts by the cylinder walls 11a.

The communication openings 11b are opened, in the vicinity of the two cylinder walls 11a in a ceiling part of the cylinder chamber CC, at positions to be point symmetry with the rotation axis axR as the center point so that the two partitioned cylinder chambers CC are communicated with the outside of the cylinder 11. Compressed airs generated on the basis of rotation of the rotation part 12 to be mentioned later are exhausted from respective partitions of the partitioned cylinder chambers CC through these communication openings 11b.

The flow path 11c is connected with the communication openings 11b, and is formed in a shape to be point symmetry with the rotation axis axR as the center point. The flow path 11c is connected with the output part 5 on an axis line of the rotation axis axR. The compressed airs output from the partitioned cylinder chambers CC through the communication openings 11b are led to the output part 5 through this flow path 11c (see arrows 101 illustrated in FIG. 1B), and are ejected to the camera 50 through the output part 5.

The intake ports 11d are opened in an outer wall of the cylinder 11 at positions that are substantially under the respective two communication openings 11b so that the outside of the cylinder 11 is communicated with the partitioned cylinder chambers CC. Air that is taken on the basis of rotation of the rotation part 12 to be mentioned later is taken into the cylinder chamber CC through these intake ports 11d.

The rotation part 12 includes vanes 12a, a rotation base 12b, and a shaft part 12c. The rotation base 12b is formed in a round-plate-like shape, and is rotatably provided around the rotation axis axR (see arrow 102 illustrated in FIG. 1B).

Specifically, the rotation base 12b includes a driven gear 12d on a surface reverse to the cylinder 11 side, this driven gear 12d is engaged with a driving gear (not illustrated) for transmitting a rotation driving force from a motor (not illustrated) so as to be rotated in a predetermined direction around the rotation axis axR.

In a free state of not receiving the rotation driving force from the motor, the rotation base 12b is energized by a spring member (not illustrated) in a direction reverse to the predetermined direction of the rotation caused by the motor. A specific configuration including the driven gear 12d, the motor, the driving gear, and the spring member will be mentioned later with reference to FIG. 2A and the following.

The vanes 12a are formed in a plate-like shape, and are erected on a surface reverse to that on which the driven gear 12d is provided so as to segment, along the radial direction, the rotation base 12b. Each of the vanes 12a includes an intake valve 12aa in a wall thereof.

The shaft part 12c is a shaft portion for the rotation around the rotation axis axR, and is arranged between the two vanes 12a so as to link the two vanes 12a.

The rotation part 12 configured in this manner is engaged with the cylinder 11 so as to be rotated in the cylinder chamber CC, and a series of cycles including intake and exhaustion is performed so as to generate a compressed air.

Figure 1C:
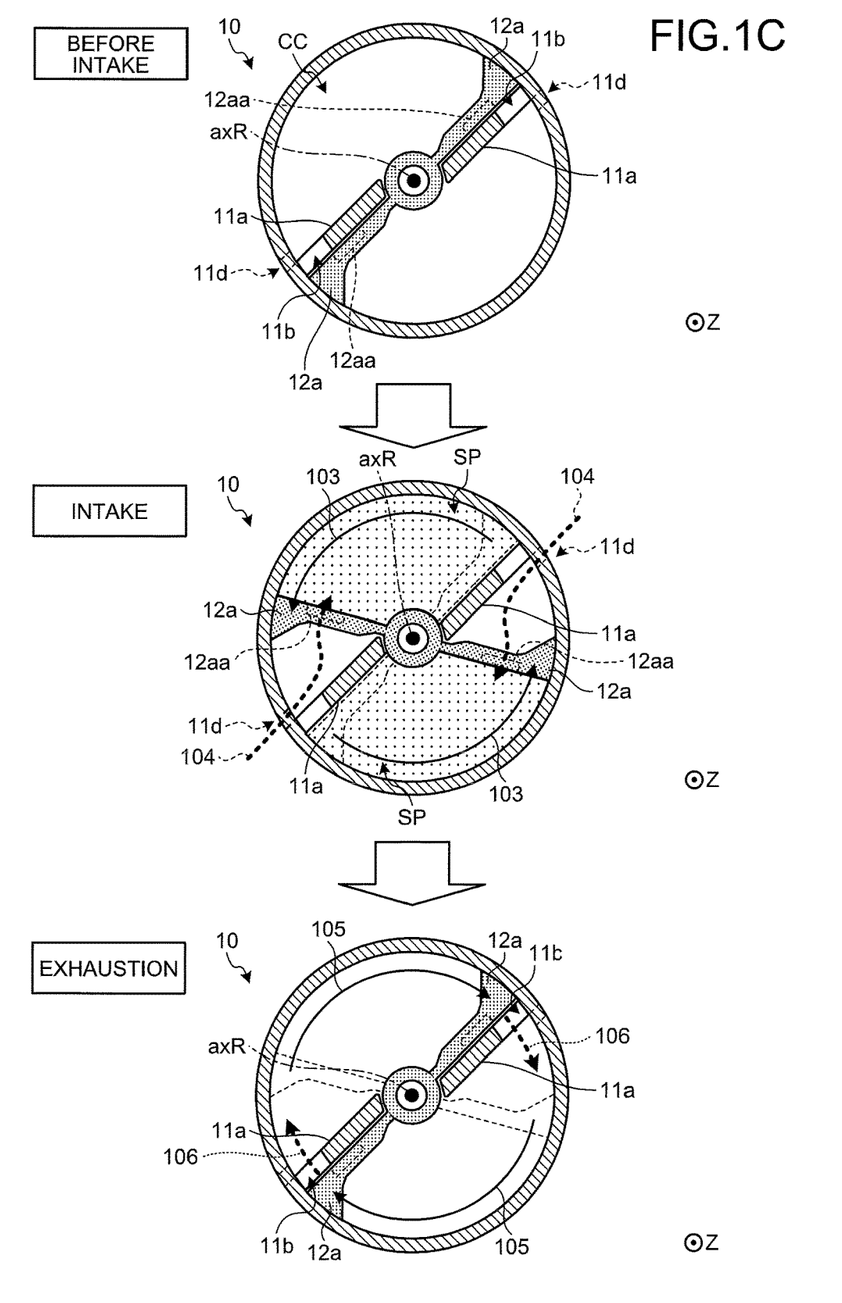
FIG. 1C is a diagram explaining operations of the air compressing part.
Figure 2A:
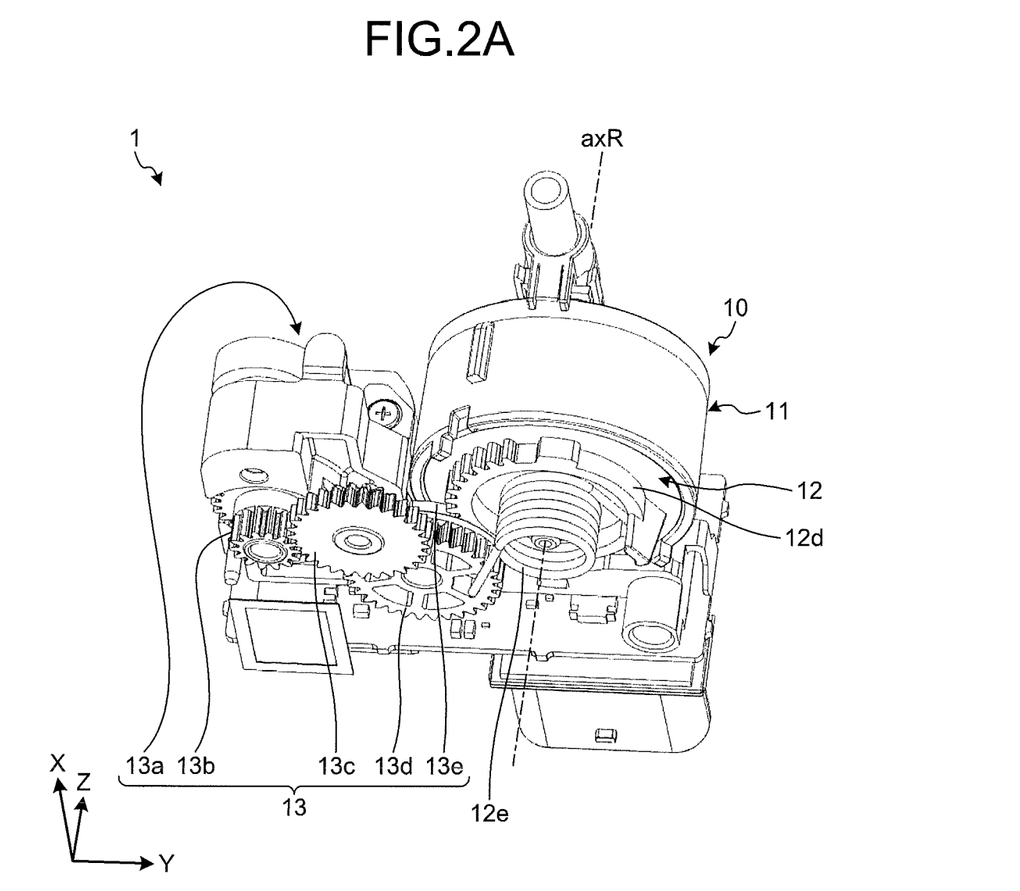
FIG. 2A is a perspective view illustrating an internal structure of the extraneous-matter removing apparatus.

Specifically, as illustrated in FIG. 1C, in a state of "before intake", the air compressing part 10 is first in such a state that the vanes 12a are in contact with the cylinder walls 11a.

When the vanes 12a are rotated in a predetermined direction away from the cylinder walls 11a around the rotation axis axR (see arrows 103 illustrated in FIG. 1C) from the state of this "before intake", rooms SP between the vanes 12a and the cylinder walls 11a are expanded by this separating. The "predetermined direction" is assumed to be a left-hand turn (counterclockwise) on the sheet of FIG. 1C.

Thus, the negative pressure is generated in the rooms SP, as indicated by arrows 104 illustrated in FIG. 1C, and air flows into the rooms SP from the intake ports 11d through the intake valves 12aa, in other words, "air is taken (intake)". It is preferable that each of the intake valves 12aa is configured to be, for example, a check valve so that air does not flow in a direction reverse to that during the intake.

When the vanes 12a are rotated in a direction (in other words, clockwise) reverse to the above predetermined direction around the rotation axis axR from the state of "intake" (see arrows 105 illustrated in FIG. 1C), the vanes 12a move in a direction to approach the cylinder walls 11a so as to contract the rooms SP. Thus, the air that is taken into the rooms SP are compressed and a compressed air is generated.

The vanes 12a are rotated around the rotation axis axR until the vanes 12a return to a state of being in contact with the cylinder walls 11a, whereby the generated compressed air is pushed out from the communication openings 11b so as to be exhausted ("exhaustion": see arrows 106 illustrated in FIG. 1C).

Meanwhile, in the present embodiment, a cycle including intake and exhaustion for generating the compressed air is performed by the rotation operations illustrated in FIG. 1C, and a motor is commonly appropriate for inexpensively and stably acquiring a rotation driving force. Note that, as illustrated in FIG. 1C, if a reciprocating movement of the vanes 12a for reciprocating around the rotation axis axR in a direction away from the cylinder walls 11a or in a direction approaching the cylinder walls 11a is to be realized by, for example, normal and reverse rotations of a motor, control and structure of the motor may be complicated.

Therefore, in the present embodiment, a rotation direction of the motor is set to be basically one direction, and an rotation mechanism for causing the air compressing part 10 to rotate is configured to be simple and compact so that the above reciprocating movement of the vanes 12a is able to be performed by this one-direction rotation movement.

Hereinafter, more specific configurations of the extraneous-matter removing apparatus 1 according to the present embodiment including this rotation mechanism will be sequentially explained with reference to FIG. 2A and the following. FIG. 2A is a perspective view illustrating an internal structure of the extraneous-matter removing apparatus 1.

As described above, as illustrated in FIG. 2A, the extraneous-matter removing apparatus 1 includes the air compressing part 10 and the air compressing part 10 includes the cylinder 11 and the rotation part 12. The rotation part 12 includes the driven gear 12d. The driven gear 12d is coaxially arranged with the rotation axis axR. The air compressing part 10 has a rotation type, and thus the configuration of the air compressing part 10 is able to be compact without large space.

The rotation part 12 includes an energizing spring 12e corresponding to the above "spring member". The energizing spring 12e is provided to energize the rotation part 12 in a direction reverse to the predetermined rotation direction of the rotation part 12 that is to be rotated by the motor.

The air compressing part 10 further includes a drive unit 13. The drive unit 13 includes a motor 13a, a first gear 13b, a second gear 13c, a third gear 13d, and a previous-stage gear 13e.

The motor 13a is one example of a rotation driving source, and is an electric motor, for example. Alternatively, the motor 13a may be a hydraulic motor. The motor 13a is controlled by the controller 70 (see FIG. 1A). In the present embodiment, the motor 13a basically rotates in one direction. A worm gear (not illustrated) is formed on an output shaft of the motor 13a, for example, and the output shaft of the motor 13a is connected with the first gear 13b through this worm gear.

The first gear 13b is connected with the second gear 13c. The second gear 13c is connected with the third gear 13d. The third gear 13d is arranged coaxially with the previous-stage gear 13e and is configured so as to be engaged with the driven gear 12d of the rotation part 12.

A rotation driving force from the motor 13a is transmitted to the previous-stage gear 13e through the first gear 13b, the second gear 13c, and the third gear 13d, which are connected in this manner. The number of gears and the ways engaging the gears from the motor 13a to the previous-stage gear 13e is not limited to what is illustrated.

Figure 2B:
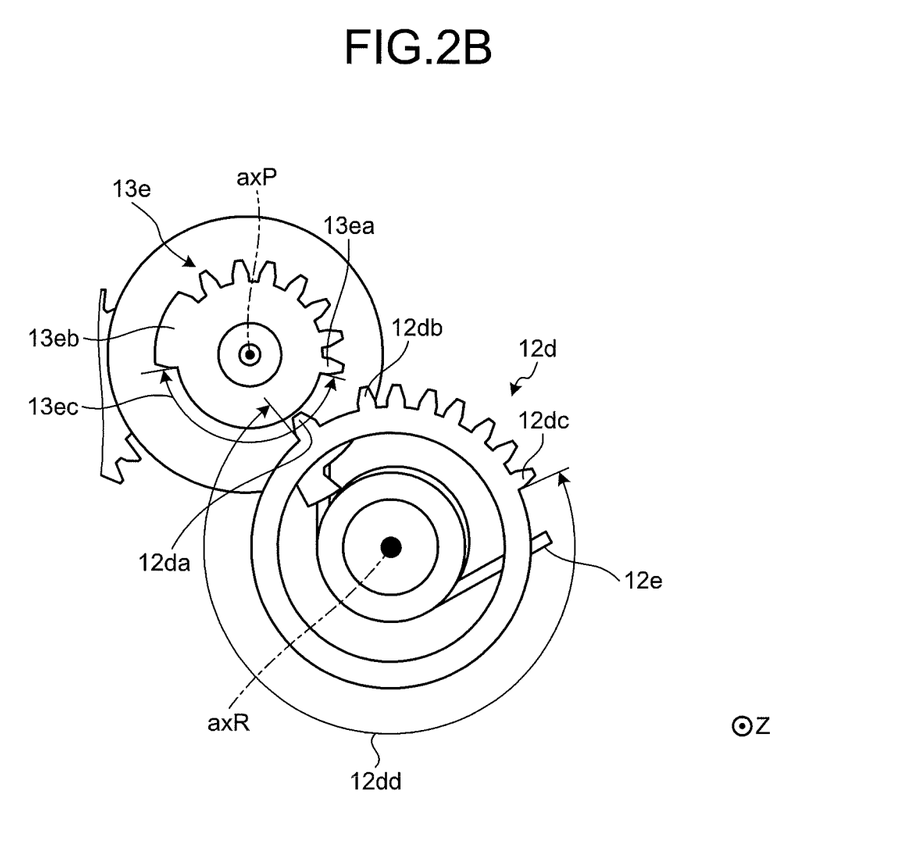
FIG. 2B is a schematic plan view illustrating a configuration of a driven gear and a previous-stage gear.

Next, FIG. 2B is a schematic plan view illustrating a configuration of the driven gear 12d and the previous-stage gear 13e. In FIG. 2B, only the driven gear 12d and the previous-stage gear 13e seen from the positive direction of the Z-axis are schematically illustrated.

As illustrated in FIG. 2B, the driven gear 12d is formed as an intermittent gear whose continuous-tooth part is cut so as to include at least a first tooth 12da, a second tooth 12db, a final tooth 12dc, and a toothless part 12dd.

The first tooth 12da is a tooth that is first engaged with the previous-stage gear 13e and the final tooth 12dc is a tooth that is finally engaged with the previous-stage gear 13e in one cycle of intake and exhaustion. Hereinafter, when seen from the positive direction of the Z-axis, the driven gear 12d is assumed to be rotated in the left-hand turn (counterclockwise) around the rotation axis axR by a rotation driving force of the motor 13a transmitted from the previous-stage gear 13e. Accordingly, the energizing spring 12e is assumed to energize the driven gear 12d in a right-hand turn (clockwise).

The previous-stage gear 13e is also formed as an intermittent gear whose continuous tooth part is cut so as to include at least a first tooth 13ea, a final tooth 13eb, and a toothless part 13ec.

The first tooth 13ea is a tooth that is engaged first with the driven gear 12d and the final tooth 13eb is a tooth that is finally engaged with the driven gear 12d in one cycle of intake and exhaustion. Hereinafter, when seen from the positive direction of the Z-axis, the previous-stage gear 13e is assumed to be rotated in the right-hand turn (clockwise) around a rotation axis axP by a rotation driving force of the motor 13a.

Figure 3:
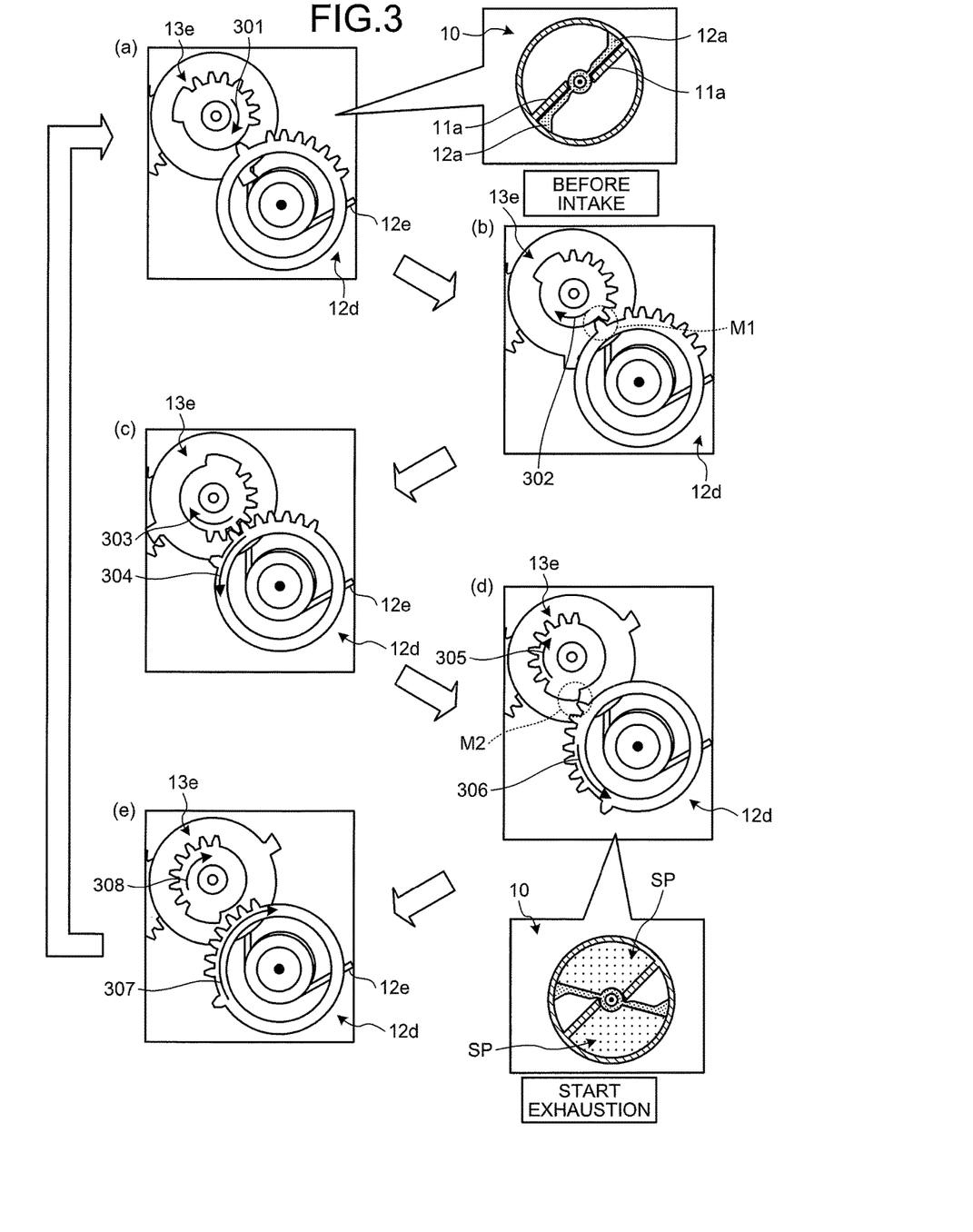
FIG. 3 is a diagram explaining more specifically the operations of the air compressing part.

Next, more specific operations of the air compressing part 10 caused by engagement between this driven gear 12d and the previous-stage gear 13e will be explained with reference to FIG. 3. FIG. 3 is a diagram explaining more specifically the operations of the air compressing part 10.

As described above, each of the driven gear 12d and the previous-stage gear 13e is formed as an intermittent gear, there exists such a state that they are not engaged with each other by a chipped tooth. In the present embodiment, this state of not engaging with each other is used.

As illustrated in FIG. 3(a), the motor 13a is driven and the previous-stage gear 13e is rotated as indicated by an arrow 301 illustrated in FIG. 3, however, the previous-stage gear 13e is still in a state of not engaged with the driven gear 12d. As illustrated in FIG. 3, this state is corresponding to a state of "before intake" of the air compressing part 10.

In this state of "before intake", the vanes 12a of the air compressing part 10 is in a state of being pressed against the cylinder walls 11a by a spring force of the energizing spring 12e.

As illustrated in FIG. 3(b), from this state, when the previous-stage gear 13e is further rotated in one direction (see arrow 302 illustrated in FIG. 3), the driven gear 12d and the previous-stage gear 13e start to be engaged with each other (see part M1 illustrated in FIG. 3). This state is corresponding to a state where the air compressing part 10 starts to take air (intake).

As illustrated in FIG. 3(c), further rotation of the previous-stage gear 13e in the one direction (see arrow 303 illustrated in FIG. 3) causes the engaged driven gear 12d to rotate in the left-hand turn against an energizing force of the energizing spring 12e (see arrow 304 illustrated in FIG. 3). This state is corresponding to a state where air is taken ("intake") by the air compressing part 10.

In other words, when engaged with the previous-stage gear 13e, the driven gear 12d is rotated in the left-hand turn because a force for rotating the driven gear 12d in a predetermined direction (left-hand turn) by drive of the motor 13a that is connected with the previous-stage gear 13e is stronger than a force for rotating the driven gear 12d in a reverse direction (right-hand turn) of energization by the energizing spring 12e. In other words, the force for rotating the driven gear 12d in the reverse direction (right-hand turn) of energization of the energizing spring 12e is weaker than the force for rotating the driven gear 12d in the predetermined direction (left-hand turn) by drive of the motor 13a.

On the other hand, when the driven gear 12d and the previous-stage gear 13e are not engaged with each other, namely, when the engagement between the driven gear 12d and the previous-stage gear 13e is released by the above chipped tooth and the driven gear 12d is turned into a free state, the driven gear 12d is rotated in the reverse direction (right-hand turn) because only the energizing force of the energizing spring 12e is worked on the driven gear 12d. In other words, the energizing spring 12e has an energizing force whose force for rotating the driven gear 12d by its energization in the reverse direction (right-hand turn) is weaker than the force for rotating the driven gear 12d in the predetermined direction (left-hand turn) caused by the motor 13a.

Specifically, as illustrated in FIG. 3(d), there comes a moment when the engagement between the driven gear 12d and the previous-stage gear 13e is released (see part M2 illustrated in FIG. 3) by further rotation of the previous-stage gear 13e and the driven gear 12d from the state illustrated in FIG. 3(c) (see arrows 305 and 306 illustrated in FIG. 3). The state of this moment is corresponding to a state of "start exhaustion" of the air compressing part 10, as illustrated in FIG. 3.

As illustrated in FIG. 3(e), the driven gear 12d whose engagement with the previous-stage gear 13e is released returns energetically in the right-hand turn by the spring force of the energizing spring 12e (see arrow 307 illustrated in FIG. 3) so as to compress and exhaust the air having been taken in the rooms SP. The previous-stage gear 13e is rotated in the one direction (see arrow 308 illustrated in FIG. 3), and operations from those illustrated in FIG. 3(a) are repeatedly performed in performing the next one cycle of intake and exhaustion.

In this manner, the present embodiment employs a configuration for generating, by using the toothless portion, a timing when the previous-stage gear 13e and the driven gear 12d are not engaged with each other so as to return the driven gear 12d in the reverse direction by using the energizing spring 12e at this timing, and thus the cycle is able to be performed by the motor 13a that rotates in an only one direction. Thus, it is possible to generate a compressed air by a simple configuration.

The configuration according to the present embodiment is able to be compact and space-saved compared with that of an air compressing mechanism having, for example, a piston structure in which a piston reciprocates in a cylinder, because the air compressing part 10 is configured to be a rotation-type air compressing mechanism. In other words, according to the present embodiment, it is possible to generate a compressed air by a simple and compact configuration.

Figure 4:
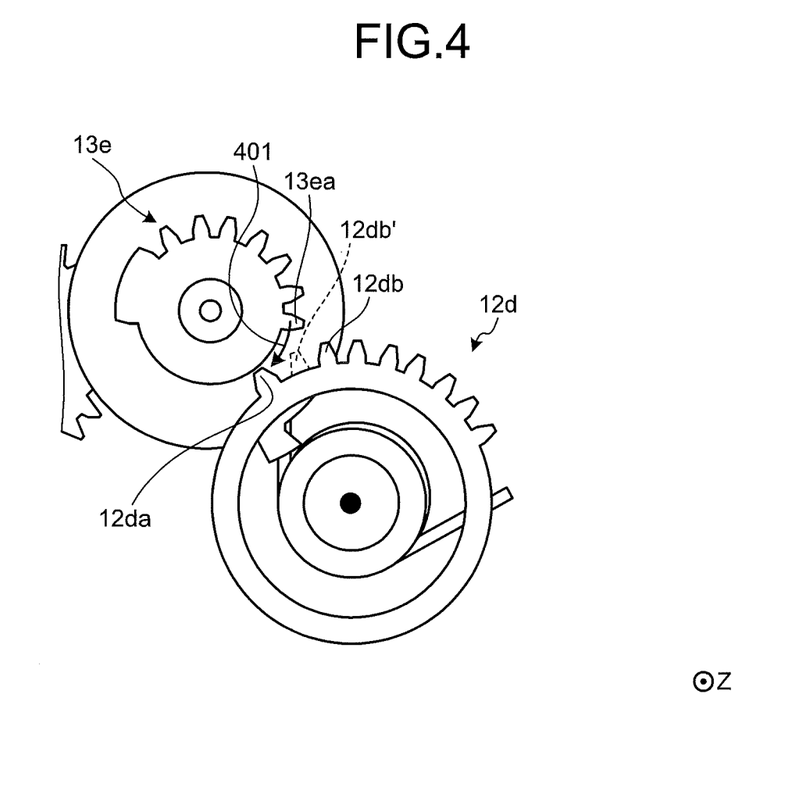
FIG. 4 is a schematic plan view illustrating an intermittent structure of a second tooth of the driven gear.

More specific configuration of the air compressing part 10 according to the present embodiment will be explained. FIG. 4 is a schematic plan view illustrating an intermittent structure of the second tooth of the driven gear 12d.

As illustrated in FIG. 4, in the present embodiment, an intermittent structure in which a second tooth 12db' is cut from the driven gear 12d as indicated by dashed lines. The second tooth 12db' is supposed to exist between the first tooth 12da and the second tooth 12db judged from the same pitch width.

In other words, an interval between the first tooth 12da that is first engaged with the previous-stage gear 13e when the toothless part 13ec (see FIG. 2B) is interrupted and the second tooth 12db that is next engaged with the previous-stage gear 13e is larger than an interval between other teeth that are adjacent to each other.

Thus, as indicated by an arrow 401 illustrated in FIG. 4, when the first tooth 13ea enters between the first tooth 12da and the second tooth 12db in accordance with rotation of the previous-stage gear 13e because of the engagement, it is possible to ease the entrance of the first tooth 13ea. In other words, it is possible to avoid a collision between tooth tips when the previous-stage gear 13e and the driven gear 12d are to be engaged with each other, and thus a failure such as a breakage in a tooth tip is able to be prevented.

Moreover, a space for guiding the first tooth 13ea into the teeth is able to be configured to be large, and thus it is possible to provide an allowance for accuracy in a stop position of the driven gear 12d.

Next, more specific configurations of the previous-stage gear 13e and the final tooth 13eb will be explained. FIGS. 5A to 5D are schematic plan views illustrating configurations of the final tooth 13eb of the previous-stage gear 13e. FIGS. 5B to 5D are enlarged views illustrating a vicinity of the final tooth 13eb.

Figure 5A:
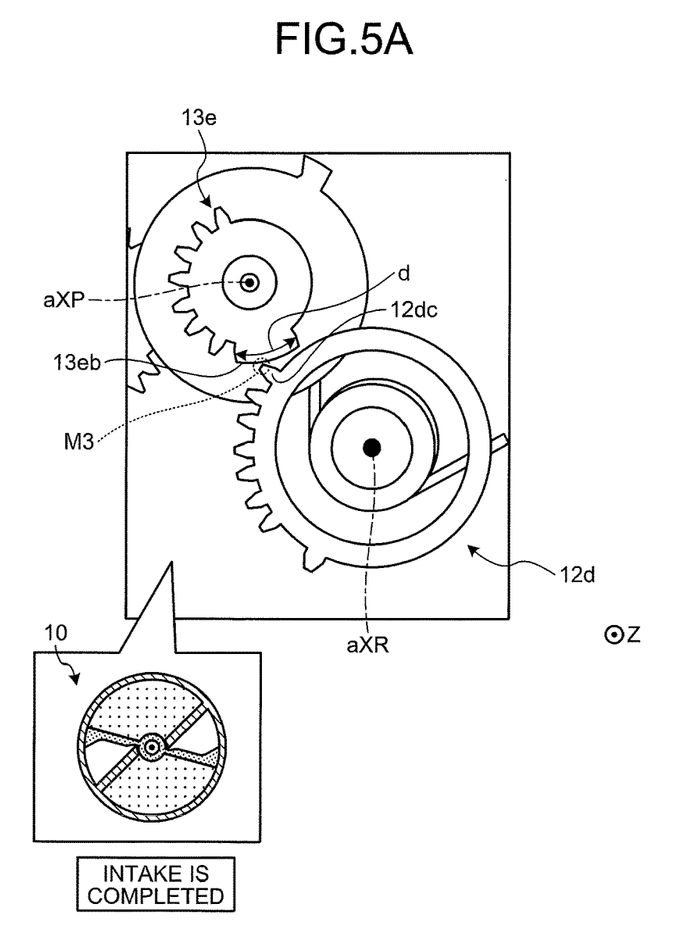
FIGS. 5A to 5D are schematic plan views illustrating configurations of a final tooth of the previous-stage gear.
Figure 5B:
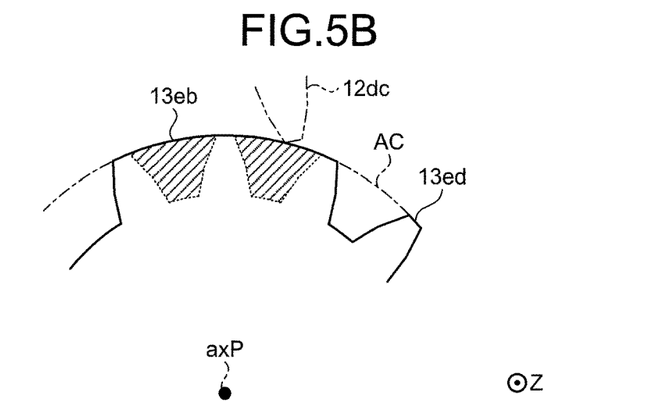
Figure 5C:
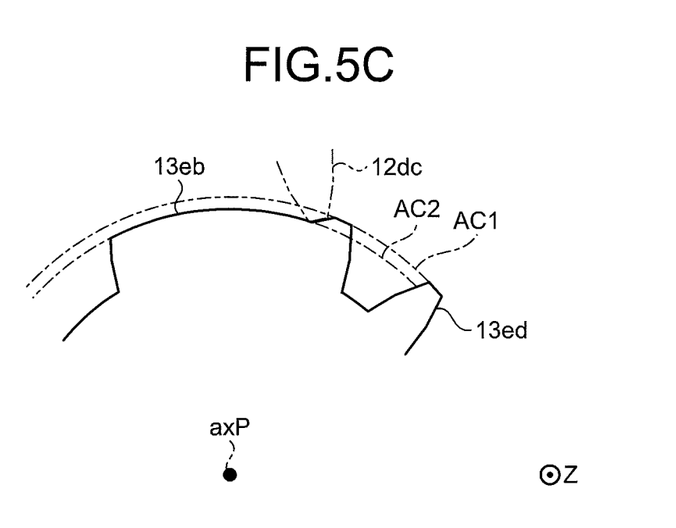
Figure 5D:
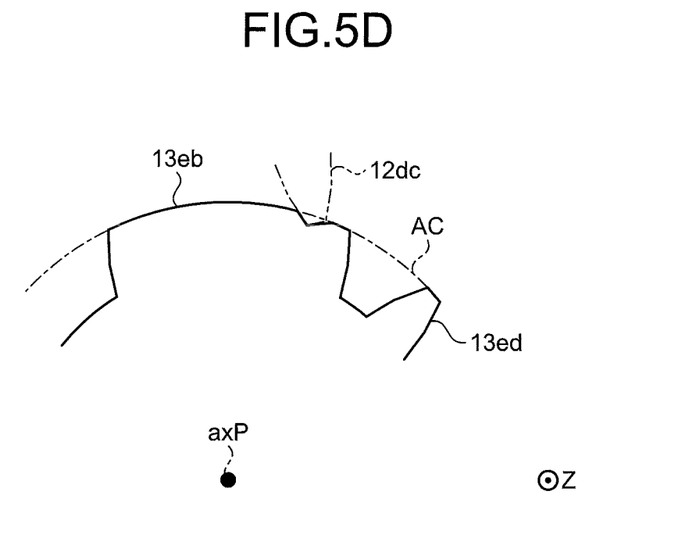

As illustrated in FIG. 5A, in the present embodiment, the length of the final tooth 13eb of the previous-stage gear 13e is extended to be "d" so that the final tooth 13eb has a cam-like shape. As indicated by a part M3 illustrated in FIG. 5A, the controller 70 (see FIG. 1A) performs a control for stopping the rotation of the motor 13a in a state where the final tooth 12dc of the driven gear 12d has got on an outer periphery of this final tooth 13eb, so that the air compressing part 10 is able to stand by with a state of "intake is completed", as illustrated in FIG. 5A.

In other words, in a case where a compressed air is to be ejected at the next time, when the motor 13a is rotated only by such an amount that the final tooth 12dc of the driven gear 12d is released from the final tooth 13eb of the previous-stage gear 13e, a compressed air is ejected, whereby it is possible to operate the extraneous-matter removing apparatus 1 with high responsiveness in response to an operation of an operator.

For example, when a performance of an operation for removing an extraneous matter of a back camera provided in a vehicle is interlocked with a reverse gear, an operation sound (contacting sound between the cylinder walls 11a and the vanes 12a, etc.) of the air compressing part 10 is to be lost in an operation sound of a shift lever, so that it is possible to give no uncomfortable feeling caused by an abnormal noise to an operator.

As illustrated in FIG. 5B, a shape of the final tooth 13eb may have a shape obtained by filling (see hatched parts illustrated in FIG. 5B) one or more gaps between a plurality of teeth whose tips and a tip of a tooth 13ed in front of the plurality of teeth are on a same addendum circle AC, for example.

As illustrated in FIG. 5C, a modification in a shape of the final tooth 13eb may be formed in a shape having a level difference so that a former part of a tip of a tooth and the tooth 13ed in front of the tooth are on a same addendum circle AC1, and the latter part of the tip of the tooth part is on an addendum circle AC2 that is an inner concentric circle of the addendum circle AC1, for example.

In this case, it is possible to prevent the final tooth 12dc of the driven gear 12d from reversing to be released from the previous-stage gear 13e, for example. Moreover, it is possible to prevent a breakage in a configuration part such as a gear, in a case of the reverse.

In such a case that the motor 13a is used in a state of rotating in a direction reverse to the predetermined direction (for example, in a configuration that is able to eject a washing water from the output part 5, rotations are separately used between an air-compressing use and an washing-water-supplying use, etc.), it is possible to prevent, in the air-compressing use, the previous-stage gear 13e from reversing in accordance therewith.

In order to obtain similar effects, a further modification in a shape of the final tooth 13eb may be formed in such a shape that, as illustrated in FIG. 5D, a tip of a tooth and the tip of the tooth 13ed in front of the tooth are on the same addendum circle AC and a part of the tooth is cut, for example. In this case, the final tooth 12dc is engaged with this cut of the driven gear 12d, whereby it is possible to prevent the driven gear 12d from reversing.

In any case illustrated in FIGS. 5C and 5D, the final tooth 13eb of the previous stage gear 13e has a level difference for engaging with the driven gear 12d in its outer periphery part.

Next, more specific configuration of the final tooth 12dc of the driven gear 12d will be explained. FIGS. 6A to 6D are schematic plan views illustrating a configuration of the final tooth 12dc of the driven gear 12d. FIG. 6B is an enlarged view illustrating a vicinity of the final tooth 12*dc*, and FIG. 6D is an enlarged view illustrating a part M4 illustrated in FIG. 6C.

Figure 6A:
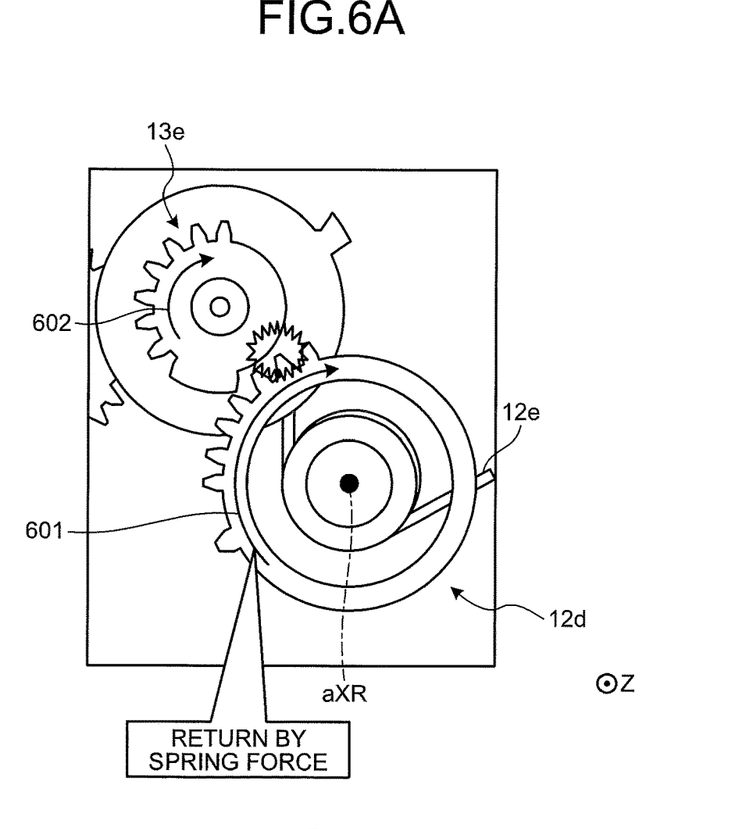
FIGS. 6A to 6D are schematic plan views illustrating a configuration of a final tooth of the driven gear.
Figure 6B:
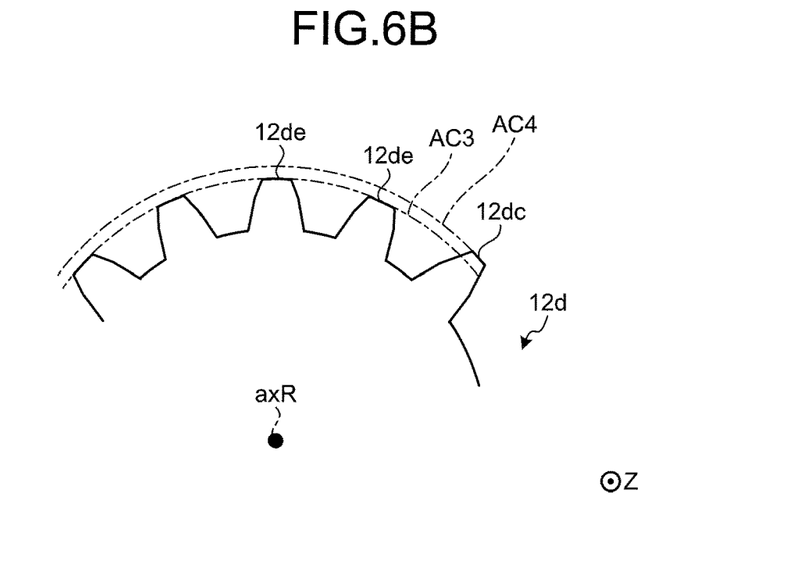

As illustrated in FIG. 6A, a case is assumed where the engagement of the driven gear 12*d* with the previous-stage gear 13*e* is released, and the driven gear 12*d* is rotated around the rotation axis axR in the right-hand turn by "return by spring force" of the energizing spring 12*e* (see arrow 601 illustrated in FIG. 6A).

Commonly, the previous-stage gear 13*e* continues to be rotated as indicated by an arrow 602 illustrated in FIG. 6A so that the tooth tips of the previous-stage gear 13*e* are also moved after the engagement of the driven gear 12*d* with the previous-stage gear 13*e* is released, whereby it is assumed that the tooth tips do not interfere with each other until the driven gear 12*d* and the previous-stage gear 13*e* are next engaged with each other.

However, in such a case that a return rotation speed generated by the energizing spring 12*e* is very large, there exists a bias in the circularity of the addendum circle etc. of the driven gear 12*d*, or there exists a subtle error or backlash generated in assembling, as illustrated in FIG. 6A, the driven gear 12*d* and the previous-stage gear 13*e* may interfere with each other in some cases. This interference is not preferable because the interference causes rapid attrition of parts or occurrence of an abnormal sound.

Therefore, in the present embodiment, as illustrated in FIG. 6B, the final tooth 12*dc* of the driven gear 12*d* is protruded so that a tooth tip of the final tooth 12*dc* is on an addendum circle AC4 that is an outer concentric circle of the addendum circle AC3 of other teeth 12*de*.

Figure 6C:
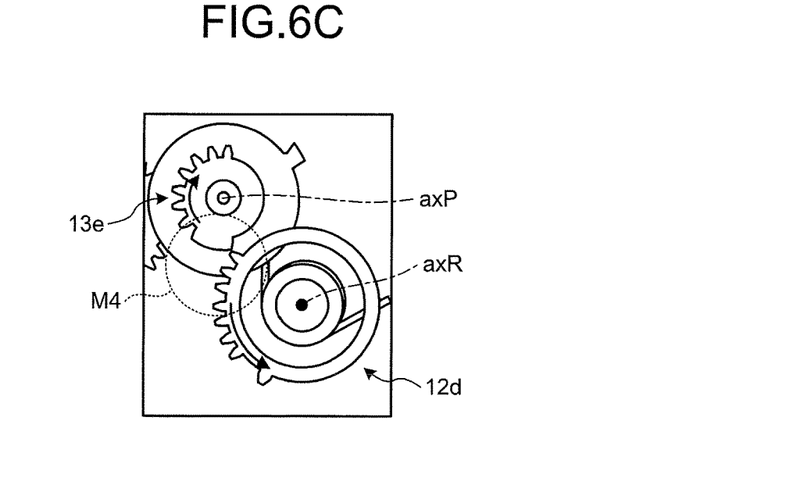
Figure 6D:
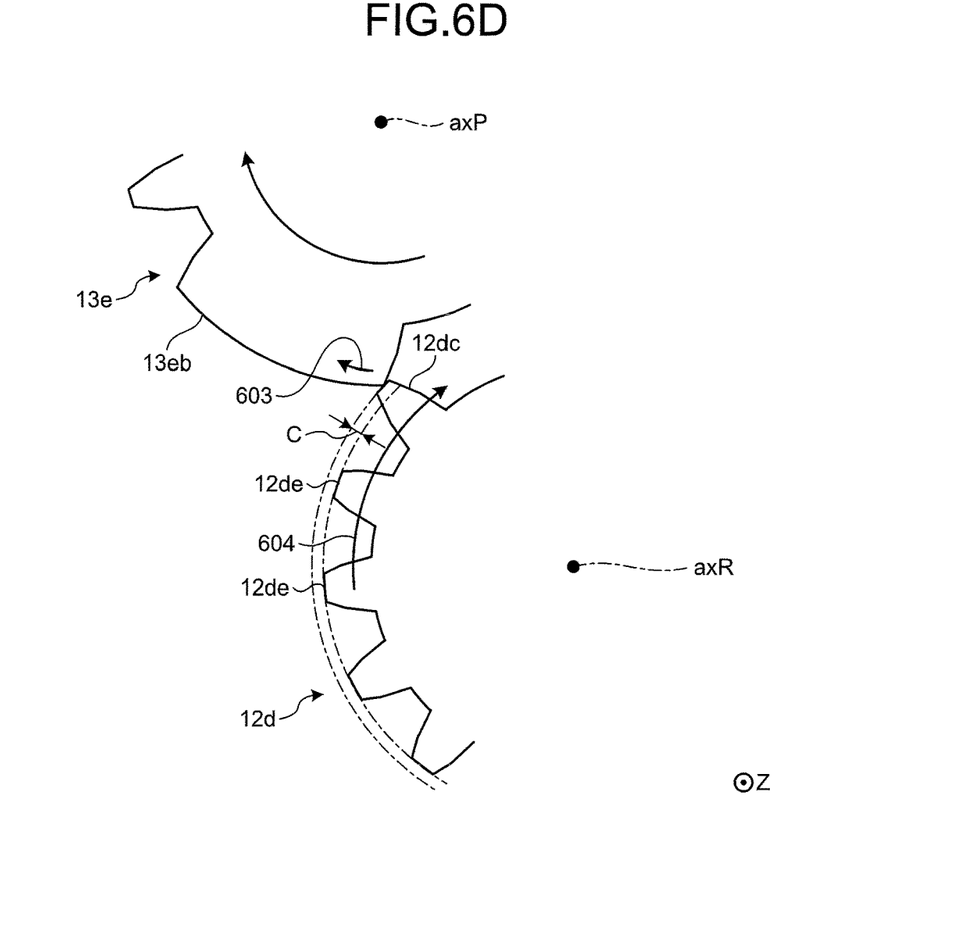

Thus, as illustrated in FIGS. 6C and 6D, when the engagement between the final tooth 12*dc* of the driven gear 12*d* and the final tooth 13*eb* of the previous-stage gear 13*e* is released, a clearance C of the previous-stage gear 13*e* for the other teeth 12*de* is able to be provided (see arrow 603 illustrated in FIG. 6D).

In other words, interference between the driven gear 12*d* and the previous-stage gear 13*e* is able to be prevented when the driven gear 12*d* is returned in the right-hand turn (clockwise) by the energizing spring 12*e* (see arrow 604 illustrated in FIG. 6D).

In a position relation between the final tooth 12*dc* of the driven gear 12*d* and the tooth tips of the other teeth 12*de*, it is sufficient that the final tooth 12*dc* is relatively higher than the tooth tips of the other teeth 12*de*, and thus the position relation may be realized by extending the final tooth 12*dc*, or may be realized by shortening the other teeth 12*de*.

As described above, the air compressing part 10 (corresponding to one example of "rotation device") according to the present embodiment includes the previous-stage gear 13*e* (corresponding to one example of "first gear"), the driven gear 12*d* (corresponding to one example of "second gear"), and the energizing spring 12*e* (corresponding to one example of "energizing part"). The previous-stage gear 13*e* includes the toothless part 13*ec* and is connected with the motor 13*a* (corresponding to one example of "rotation driving source"). The toothless part 13*ec* is obtained by cutting a part of continuous teeth of the previous-stage gear 13*e*. The driven gear 12*d* is arranged to be able to be engaged with the previous-stage gear 13*e* and is rotated, when engaged with the previous-stage gear 13*e*, in a predetermined direction by a rotation of the motor 13*a* in one direction. The energizing spring 12*e* energizes the driven gear 12*d* in a direction reverse to the predetermined direction when the driven gear 12*d* is in a free state in which an engagement of the driven gear 12*d* with the previous-stage gear 13*e* is released by the toothless part 13*ec*.

Thus, by employing the air compressing part 10 according to the present embodiment, it is possible to generate a compressed air with a simple and compact configuration.

In the aforementioned embodiment, the driven gear 12*d* and the previous-stage gear 13*e* are configured to include the respective toothless parts 12*dd*, 13*ec*, however, the toothless part may be included in only one of the driven gear 12*d* and the previous-stage gear 13*e*. In other words, it is sufficient that (i) a state where both the driven gear 12*d* and the previous-stage gear 13*e* are engaged with each other so that the driven gear 12*d* is rotated by rotation of the previous-stage gear 13*e* and (ii) a state where both the driven gear 12*d* and the previous-stage gear 13*e* are not engaged with each other so that the driven gear 12*d* is in a free state are able to be realized, the toothless part may be included in at least one of the driven gear 12*d* and the previous-stage gear 13*e*.

In the aforementioned embodiment, the case is explained where the air compressing part 10 is exemplified as one example of a rotation device and the air compressing part 10 generates a compressed air, however in the present embodiment, not limited to air, the rotation device may be used for compressing various gases, liquids (fluids), powders, etc. Here each of the powders is one aggregate including medium occupying spaces (air gaps) between powders (particles), whereby behaves as fluid in some cases, and thus is exemplified as one example of fluids as well as gases and liquids. Therefore, by employing the rotation device according to the present embodiment, it is possible to generate a compressed fluid with a simple and compact configuration.

In the aforementioned embodiment, the case is exemplified in which the air compressing part 10 is a rotation type, when arrangement space is allowable, the present embodiment may be applied to, for example, a piston structure for causing a piston to reciprocate in a cylinder. In this case, the driven gear 12*d* side is configured to be a rack gear.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotation device comprising:
   a first gear that includes a toothless part and is connected with a rotation driving source, the toothless part being obtained by cutting a part of continuous teeth of the first gear;
   a second gear that is arranged to be able to be engaged with the first gear and is rotated, when engaged with the first gear, in a predetermined direction by a rotation of the rotation driving source in one direction; and
   an energizing part that energizes the second gear in a direction reverse to the predetermined direction when the second gear is in a free state in which an engagement of the second gear with the first gear is released by the toothless part.

2. The rotation device according to claim 1, further comprising:
   a cylinder; and
   a rotating body that is provided in the cylinder rotatably around a rotation axis, wherein the second gear is provided in the rotating body, the second gear being arranged coaxially with the rotation axis.

3. The rotation device according to claim 2, wherein an interval between (i) a first tooth of the second gear that is first engaged with the first gear when the toothless part is interrupted and (ii) the second tooth of the second gear that is next engaged with the first gear is larger than an interval between other teeth of the second gear that are adjacent to each other.

4. The rotation device according to claim 3, wherein an addendum circle of a final tooth of the second gear that is finally engaged with the first gear is an outer concentric circle of one or more addendum circles of other teeth of the second gear.

5. The rotation device according to claim 2, wherein an addendum circle of a final tooth of the second gear that is finally engaged with the first gear is an outer concentric circle of one or more addendum circles of other teeth of the second gear.

6. The rotation device according to claim 2, wherein
the cylinder includes:
a cylinder chamber that is cylindrically formed to house the rotating body; and
two cylinder walls that are formed in a substantially plate shape so as to segment the cylinder chamber along a substantially radial direction of the rotation axis in positions to be point symmetry with the rotation axis as a center,
the rotating body includes:
a rotation base that is formed in a substantially round-plate shape and includes the second gear that is arranged on or above a surface reverse to the cylinder; and
two vanes that are formed in a substantially plate shape and are erected on a surface close to the cylinder so as to segment the rotation base along a radial direction of the rotation axis, and
the first gear causes, when engaged with the second gear, the second gear to rotate in the predetermined direction against an energizing force of the energizing part so as to expand rooms between the vanes and the respective cylinder walls, and the energizing force of the energizing part causes, when the second gear is in the free state by the toothless part, the second gear to rotate in the direction reverse to the predetermined direction so as to compress the expanded rooms.

7. The rotation device according to claim 6, wherein
the first gear includes a part whose shape is obtained by extending, along an addendum circle, a tooth tip of a final tooth that is finally engaged with the second gear, and
the rotation driving source is controlled so that the rotation driving source stops rotating in a state where a final tooth of the second gear has got on the final tooth of the first gear.

8. The rotation device according to claim 7, wherein the final tooth of the first gear includes, in at least a part of an outer periphery of the final tooth of the first gear, a level difference that is to be engaged with the second gear.

9. The rotation device according to claim 1, wherein an interval between (i) a first tooth of the second gear that is first engaged with the first gear when the toothless part is interrupted and (ii) the second tooth of the second gear that is next engaged with the first gear is larger than an interval between other teeth of the second gear that are adjacent to each other.

10. The rotation device according to claim 9, wherein an addendum circle of a final tooth of the second gear that is finally engaged with the first gear is an outer concentric circle of one or more addendum circles of other teeth of the second gear.

11. The rotation device according to claim 1, wherein an addendum circle of a final tooth of the second gear that is finally engaged with the first gear is an outer concentric circle of one or more addendum circles of other teeth of the second gear.

12. An extraneous-matter removing apparatus comprising:
the rotation device according to claim 1, wherein
the extraneous-matter removing apparatus ejects a compressed fluid generated by the rotation device to an optical sensor so as to remove an extraneous matter adhered to the optical sensor.

13. The extraneous-matter removing apparatus according to claim 12, wherein the optical sensor includes an on-vehicle camera that is provided in a vehicle.

14. A rotation device comprising:
a first gear that is connected with a rotation driving source;
a second gear that is arranged to be able to be engaged with the first gear and is rotated, when engaged with the first gear, in a predetermined direction by a rotation of the rotation driving source in one direction; and
an energizing part that energizes the second gear in a direction reverse to the predetermined direction, wherein
at least one of the first and second gears includes a toothless part obtained by cutting a part of continuous teeth of the at least one of the first and second gears, and
the energizing part has an energizing force in which a force for rotating the second gear by energization in the direction reverse to the predetermined direction is weaker than a force for rotating the second gear in the predetermined direction caused by the rotation driving source.

* * * * *

UNITED STATES PATENT AND TRADEMARK OFFICE
CERTIFICATE OF CORRECTION

PATENT NO.       : 10,704,551 B2
APPLICATION NO.  : 15/723559
DATED            : July 7, 2020
INVENTOR(S)      : Masashi Otomi et al.

It is certified that error appears in the above-identified patent and that said Letters Patent is hereby corrected as shown below:

In the Claims

Column 10, Line 48-Column 12, Lines 1-55, should read:

1. A rotation device comprising:
   a cylinder;
   a rotating body that is provided in the cylinder and rotatable around a rotation axis;
   a first gear that includes a toothless part and is connected with a rotation driving source, the toothless part being obtained by cutting a part of continuous teeth of the first gear;
   a second gear that is part of the rotating body, that is arranged coaxially with the rotation axis, and that is arranged to be engageable with the first gear and is rotated, when engaged with the first gear, in a predetermined direction by a rotation of the rotation driving source in one direction; and
   an energizing part that energizes the second gear in a direction reverse to the predetermined direction when the second gear is in a free state in which an engagement of the second gear with the first gear is released by the toothless part.

2. The rotation device according to claim 1, wherein an interval between (i) a first tooth of the second gear that is first engaged with the first gear when the toothless part is interrupted and (ii) the second tooth of the second gear that is next engaged with the first gear is larger than an interval between other teeth of the second gear that are adjacent to each other.

3. The rotation device according to claim 1, wherein an addendum circle of a final tooth of the second gear that is a last tooth to be engaged with the first gear is an outer concentric circle of one or more addendum circles of other teeth of the second gear.

4. The rotation device according to claim 2, wherein an addendum circle of a final tooth of the second gear that is a last tooth to be engaged with the first gear is an outer concentric circle of one or more addendum circles of other teeth of the second gear.

Signed and Sealed this
Twenty-second Day of September, 2020

Andrei Iancu
*Director of the United States Patent and Trademark Office*

5. The rotation device according to claim 1, wherein
   the cylinder includes:
   a cylinder chamber that is cylindrically formed to house the rotating body; and
   two cylinder walls that are formed in a substantially plate shape so as to segment the cylinder chamber along a substantially radial direction of the cylinder chamber in positions that are in point symmetry with the rotation axis as a center,
   the rotating body includes:
   a rotation base that is formed in a substantially round-plate shape and includes the second gear that is arranged on or above a surface reverse to the cylinder; and
   two vanes that are formed in a substantially plate shape and are erected on a surface close to the cylinder so as to segment the rotation base along the radial direction, and
   the first gear causes, when engaged with the second gear, the second gear to rotate in the predetermined direction against an energizing force of the energizing part so as to expand rooms between the vanes and the respective cylinder walls, and the energizing force of the energizing part causes, when the second gear is in the free state by the toothless part, the second gear to rotate in the direction reverse to the predetermined direction so as to compress the expanded rooms.

6. The rotation device according to claim 5, wherein
   the first gear includes a part whose shape is obtained by extending, along an addendum circle, a tooth tip of a final tooth of the first gear that is a last tooth to be engaged with the second gear, and
   the rotation driving source is controlled so that the rotation driving source stops rotating in a state where a final tooth of the second gear has engaged the final tooth of the first gear.

7. The rotation device according to claim 6, wherein the final tooth of the first gear includes, in at least a part of an outer periphery of the final tooth of the first gear, a level difference that is to be engaged with the second gear.

8. An extraneous-matter removing apparatus comprising:
   the rotation device according to claim 1, wherein
   the extraneous-matter removing apparatus ejects a compressed fluid generated by the rotation device to an optical sensor so as to remove extraneous matter adhered to the optical sensor.

9. The extraneous-matter removing apparatus according to claim 8, wherein the optical sensor includes an on-vehicle camera that is provided in a vehicle.

10. A rotation device comprising:
    a cylinder;
    a rotating body that is provided in the cylinder and rotatable around a rotation axis;
    a first gear that is connected with a rotation driving source;
    a second gear that is part of the rotating body, that is arranged coaxially with the rotation axis, and that is arranged to be engageable with the first gear and is rotated, when engaged with the first gear, in a predetermined direction by a rotation of the rotation driving source in one direction; and
    an energizing part that energizes the second gear in a direction reverse to the predetermined direction, wherein
    at least one of the first and second gears includes a toothless part obtained by cutting a part of continuous teeth of the at least one of the first and second gears, and